(12) United States Patent
Koike

(10) Patent No.: US 9,349,028 B2
(45) Date of Patent: *May 24, 2016

(54) LABEL PRINTER, CONTROL METHOD FOR A LABEL PRINTER, AND NON-TRANSITORY STORAGE MEDIUM

(71) Applicant: Seiko Epson Corporation, Tokyo (JP)

(72) Inventor: Toshiaki Koike, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/733,078

(22) Filed: Jun. 8, 2015

(65) Prior Publication Data

US 2015/0269399 A1    Sep. 24, 2015

Related U.S. Application Data

(63) Continuation of application No. 13/863,676, filed on Apr. 16, 2013, now Pat. No. 9,082,028.

(30) Foreign Application Priority Data

Apr. 23, 2012 (JP) ................. 2012-097267

(51) Int. Cl.
*G06K 7/10* (2006.01)
*G06K 7/016* (2006.01)
*G07B 1/00* (2006.01)
*G06K 15/00* (2006.01)

(52) U.S. Cl.
CPC .......... *G06K 7/0166* (2013.01); *G06K 7/10465* (2013.01); *G06K 15/408* (2013.01); *G07B 1/00* (2013.01)

(58) Field of Classification Search
CPC ....... G07B 1/00; G06K 15/408; G06K 7/0166
USPC ................................. 340/10.51, 3.43
See application file for complete search history.

(56) References Cited

U.S. PATENT DOCUMENTS

| 5,854,950 | A | 12/1998 | Handa et al. |
| 5,962,833 | A | 10/1999 | Hayashi |
| 9,082,028 | B2 * | 7/2015 | Koike ............ G07B 1/00 |
| 2006/0220859 | A1 | 10/2006 | Nagai et al. |
| 2009/0067910 | A1 * | 3/2009 | Sugiyama ...... B41J 3/4075 400/76 |
| 2010/0225357 | A1 | 9/2010 | Priel et al. |

FOREIGN PATENT DOCUMENTS

| CN | 1157445 A | 8/1997 |
| CN | 1176402 A | 3/1998 |
| CN | 2010-17322 Y | 2/2008 |
| CN | 101506675 A | 8/2009 |
| JP | 2006-107052 | 4/2006 |

(Continued)

*Primary Examiner* — Edwin Holloway, III

(57) ABSTRACT

Writing incorrect information to an IC tag affixed to a label is prevented. When a control command including recording information, an instruction to print the recording information on a label, and an instruction to write data including at least time-related information to an IC tag affixed to the label is received from a host computer, the system controller of a label printer prints the recording information and writes the write data based on time information input from a RTC, but does not print the recording information and write the write data based on the control command if an error was detected by RTC error detector.

15 Claims, 5 Drawing Sheets

(56) References Cited

FOREIGN PATENT DOCUMENTS

| JP | 2009-083459 | 4/2009 |
| JP | 2011-011510 | 1/2011 |
| TW | 200945207 A | 11/2009 |

\* cited by examiner

LABEL PRINTER, CONTROL METHOD FOR A LABEL PRINTER, AND NON-TRANSITORY STORAGE MEDIUM

CROSS-REFERENCE TO RELATED APPLICATION(S)

This application is a continuation of, and claims priority under 35 U.S.C. §120 on, application Ser. No. 13/863,676, filed Apr. 16, 2013, which claims priority under 35 U.S.C. §119 on Japanese application no. 2012-097267, filed Apr. 23, 2012. Each such priority application is hereby expressly incorporated by reference herein in its entirety.

BACKGROUND

1. Technical Field

The present invention relates to a media processing device (label printer) that can write information to an integrated circuit tag (IC tag) disposed to a medium (label), to a control method therefor, and to a non-transitory storage medium that stores a program for controlling the label printer.

2. Related Art

Media processing devices, such as recording devices and label printers, that can write information to IC tags, such as electronic tags and RFID (radio frequency identification) tags, that are embedded in a recording medium or label and configured to communicate contactlessly are known from the literature. See, for example, Japanese Unexamined Patent Appl. Pub. JP-A-2009-83459.

Media having an information-carrying IC tag are used in various ways. For example, when a customer checks a bag at the check-in counter of an airport, information identifying the flight on which the baggage is to be loaded may be written to an IC tag embedded in the baggage ticket media, and the baggage ticket is then affixed by adhesive or other means to the baggage. When the baggage is then taken for loading, the information in the IC tag of the baggage ticket affixed to the luggage is read to identify the plane on which the luggage should be loaded.

When information written to the IC tag of the medium is used to identify the luggage to which the media is attached, the identification must be accurate and reliable. More generally, this is true in any situation in which information written to an IC tag is to be relied upon for identification.

SUMMARY

An object of the present invention is therefore to provide techniques in the form of structure, methods and programs for writing accurate, and hence reliable, information to the IC tag of media, such as labels.

One aspect of the invention is a label printer that can connect to a control device. The label printer comprises a real-time clock that keeps time; an error detector that detects a real-time clock error; a data writer that writes predetermined information by wireless communication to an IC tag embedded in a label on continuous paper; a printing mechanism that prints on the label; and a controller that controls the data writer, checks the error detector when identification information is received from the control device, and acquires time information from the real-time clock. The controller also causes the data writer to write the time information and identification information to the IC tag and the printing mechanism to print a symbol code on the label if the error detector did not detect a real-time clock error, and causes the data writer to prohibit the writing of the time information and identification information to the IC tag if the error detector detected a real-time clock error.

When identification information to be recorded on the label is received, the label printer in this aspect of the invention writes the identification information together with time information from the RTC to the IC tag by the data writer. The reliability of the information written to the IC tag is increased by adding time information identifying the time the data was written with the identification information unique to the IC tag. As a result, if the identification information written to the IC tag affixed to baggage received from a customer at a check-in counter in an airport is wrong, the time that the baggage was checked at the airport check-in counter can be referenced if the check-in time is also written to the IC tag, and the owner of the baggage, the flight the baggage should be loaded on, and whether the baggage was loaded can be determined. Furthermore, because time information from a RTC in the label printer is used, the reliability of the information written to the IC tag can be improved because incorrect time information will not be written to the IC tag if wrong time information is sent from the control device. The reliability of the time kept by the RTC is therefore essential. This aspect of the invention therefore does not write the write data (identification information and time information) to the IC tag if a RTC error is detected. If the IC tag is written normally, the user can therefore know that the time information and identification information was also written correctly to the IC tag. Writing incorrect time information to the IC tag can also be prevented when an RTC error occurs.

Preferably, the label printer also has a reporter, and the controller controls the reporter to report if a real-time clock error was detected by the error detector. This configuration enables the user to know by the report that a RTC error occurred and the corresponding IC tag cannot be used. The user can also take appropriate corrective action.

Preferably, the controller controls the printing mechanism to print report information on the label if a real-time clock error was detected by the error detector. By printing information that an error occurred on the label, this aspect of the invention enables the user to know that correct information was not written to the IC tag located proximally to where the error report was recorded on the label. The user can also more reliably be made aware that a real-time clock error occurred.

In another aspect of the invention, the label printer has a memory that stores report information. If a real-time clock error was not detected by the error detector, the controller controls the printing mechanism to print the identification information on the label. If a real-time clock error was detected by the error detector, the controller controls the printing mechanism to print the report information stored in the memory on the label. Thus, if a real-time clock error occurs in this aspect of the invention, the printing mechanism prints the report information on the label instead of printing the identification information. Because this report information is previously stored in a memory in the label printer, the report information does not need to be sent from the control device and can be quickly recorded.

In a label printer according to another aspect of the invention, the error detector detects a real-time clock error if the real-time clock is not operating or if the time kept by the real-time clock is reset. When the RTC is not operating, there may be a problem with the RTC itself. The RTC may also not be operating when there is a problem with the power supply, such as when the backup battery is depleted when the label printer power is turned off and stops supplying power to the RTC, or there is poor contact with the battery terminals. If the RTC is reset, the time kept by the RTC may be wrong because the time is reinitialized. A history of the RTC being reset is stored by the RTC or in the memory of the label printer, and the controller can read this information to determine if the RTC was reset. The RTC may be reset when, for example, the power supply is stopped and then resumed, there is interference from electrostatic noise or a shock, or the entire label printer is reset by a command from the control device. This aspect of the invention enables appropriately detecting RTC errors.

Another aspect of the invention is a control method for a label printer that can connect to a control device and includes a real-time clock that keeps time, an error detector that detects a real-time clock error, a data writer that writes predetermined information by wireless communication to an IC tag embedded in a label on continuous paper, and a printing mechanism that prints on the label. The control method includes checking the error detector when identification information is received from the control device; acquiring time information from the real-time clock; writing the time information and identification information to the IC tag using the data writer and printing a symbol code on the label using the printing mechanism if the error detector did not detect a real-time clock error; and prohibiting the writing of such information to the IC tag if the error detector detected a real-time clock error.

In the control method according to another aspect of the invention, the label printer has a reporter; and the control method further includes reporting by the reporter if a real-time clock error was detected by the error detector.

In the control method according to another aspect of the invention, such method further comprises reporting information on the label by the printing mechanism if a real-time clock error was detected by the error detector.

In the control method according to another aspect of the invention, the label printer has a memory that stores report information. The control method further includes printing the identification information on the label by the printing mechanism if a real-time clock error was not detected by the error detector, and printing the report information stored in the memory on the label by the printing mechanism if a real-time clock error was detected by the error detector.

In the control method according to another aspect of the invention, the error detector detects a real-time clock error if the real-time clock is not operating or if the time kept by the real-time clock is reset.

Another aspect of the invention is a non-transitory storage medium that stores a program executed by a controller that controls parts of a label printer that can connect to a control device and includes a real-time clock that keeps time, an error detector that detects a real-time clock error, a data writer that writes predetermined information by wireless communication to an IC tag embedded in a label on continuous paper, and a printing mechanism that prints on the label. The program causes the controller to: check the error detector when identification information is received from the control device; acquire time information from the real-time clock; cause the data writer to write the time information and identification information to the IC tag and the printing mechanism to print a symbol code on the label if the error detector did not detect a real-time clock error; and cause the data writer to prohibit the writing of such information to the IC tag if the error detector detected a real-time clock error.

In another aspect of a storage medium that stores a program according to the invention, the label printer has a reporter; and the program causes the controller to report by the reporter if a real-time clock error was detected by the error detector.

In another aspect of a storage medium that stores a program according to the invention, the program causes the controller to print report information on the label by the printing mechanism if a real-time clock error was detected by the error detector.

In another aspect of a storage medium that stores a program according to the invention, the label printer has a memory that stores report information; and the program causes the controller to print the identification information on the label by the printing mechanism if a real-time clock error was not detected by the error detector, and causes the controller to print the report information stored in the memory on the label by the printing mechanism if a real-time clock error was detected by the error detector.

In another aspect of a storage medium that stores a program according to the invention, the error detector detects a real-time clock error if the real-time clock is not operating or if the time kept by the real-time clock is reset.

Effect of the Invention

As the foregoing explains, the invention improves the reliability of information written to an IC tag embedded in a label. Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures.

Figure 1:
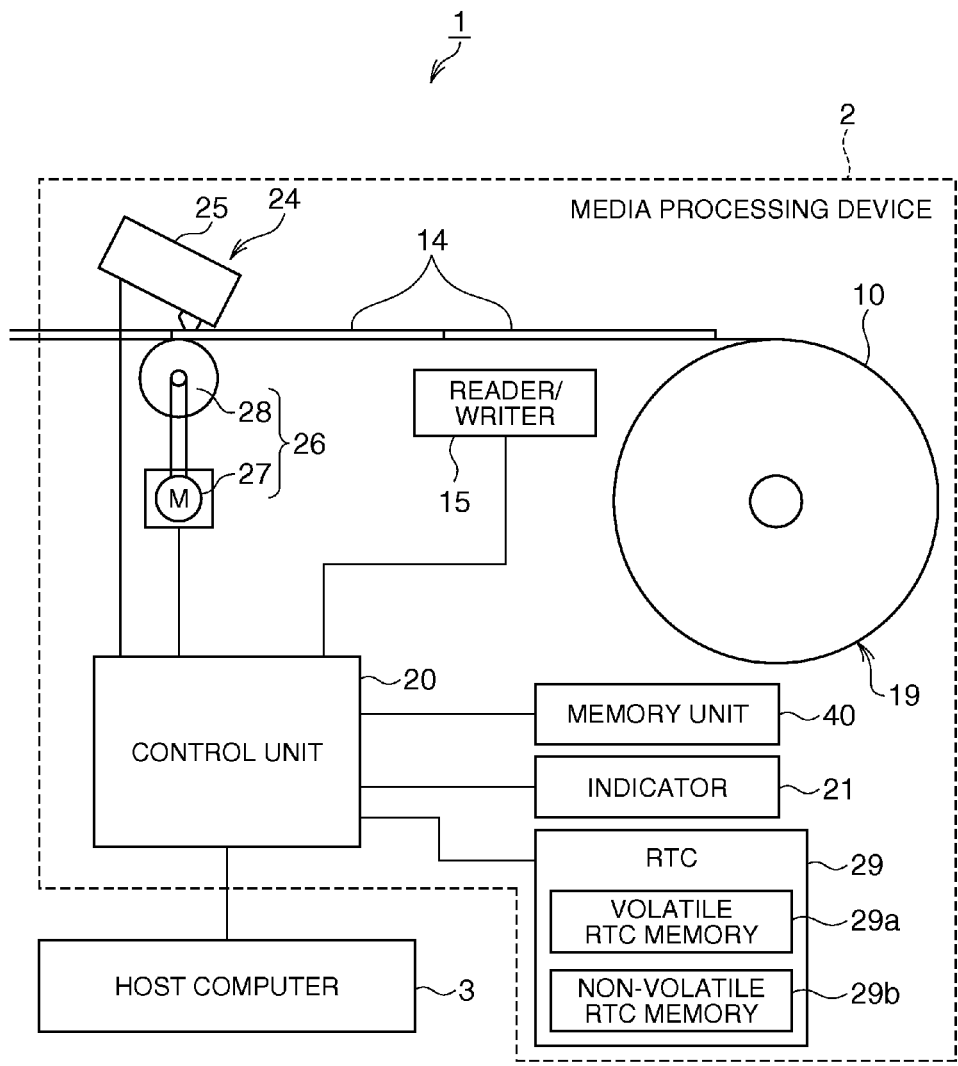
FIG. 1 illustrates a configuration of a media processing system according to a preferred embodiment of the invention.
Figure 2:
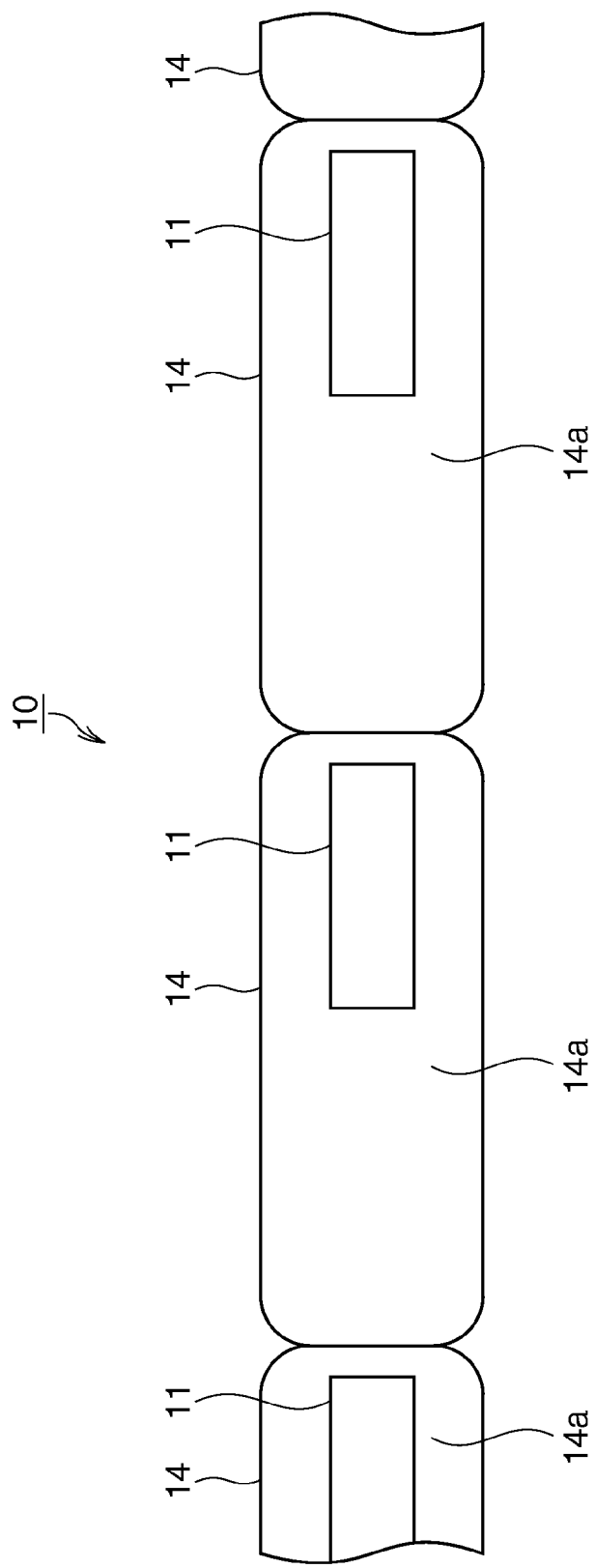
FIG. 2 shows an example of special media.

FIG. 1 shows the basic configuration of a media processing system 1 according to a preferred embodiment of the invention. FIG. 2 shows an example of special paper 10 (medium, recording medium) that is processed by the media processing device 2.

The media processing system 1 is, for example, a system that is used at check-in counters in airports where airlines accept baggage from customers. A function of the media processing system 1 is to produce labels ("baggage tags" below) with information identifying the flight of the airplane on which the baggage should be loaded recorded on the recording surface, and information identifying the flight written to an RFID tag 11 (IC tag, contactless tag) that is embedded on the baggage tag when baggage is received from a customer. The baggage tag is then attached with adhesive or a string, for example, to the baggage. When the baggage is loaded on the plane, the flight of the airplane on which the baggage should be loaded is identified by reading the information written to the RFID tag 11 of the baggage tag attached to the baggage using a dedicated reader, for example, so that the baggage is loaded on the correct flight.

As shown in FIG. 2, the special paper 10 has plural label blocks 14 connected in a continuous series in a specific direction. One label block 14 corresponds to one baggage tag, and one baggage tag is produced by recording a specific image on the recording surface 14a of one label block 14, writing specific information to the RFID tag 11 of that one label block 14, and then cutting the one label block 14 from the special paper 10.

A RFID tag 11 is disposed to each label block 14 at a specific position. The RFID tag 11 can communicate contactlessly, and communicates with the reader/writer 15 of the media processing device 2 described below by near-field wireless communication based on a specific standard such as the NFC protocol. Each RFID tag 11 has an antenna and an IC chip, and the IC chip includes a control circuit, RF (radio frequency) communication unit, signal processor that functions as a modem unit, and rewritable semiconductor non-volatile memory that stores data.

As shown in FIG. 1, the media processing system 1 has a media processing device 2 that processes special paper 10, and a host computer 3 (control device) that controls the media processing device 2.

The media processing device 2 has a storage unit 19 that stores special paper 10 in a roll. The media processing device 2 executes a specific process on each of the label blocks 14 in the special paper 10 while conveying the special paper 10 stored in the storage unit 19 in a specific direction.

The control unit 20 includes a CPU, RAM, ROM, and other peripheral circuits, and centrally controls other parts of the media processing device 2. More specifically, a control program that controls the basic operation of the media processing device 2 is stored in ROM, and the CPU of the control unit 20 controls other parts of the media processing device 2 and processes the special paper by reading and executing the control program from ROM.

The indicator 21 includes a plurality of LEDs and displays information such as the operating mode of the media processing device 2 and error reports by turning the LEDs on and off, and changing the display color of the LEDs when on, to illuminate various combinations.

The reader/writer 15 includes an antenna, RF unit, and signal processor that functions as a modem, communicates with the RFID tag 11 disposed to a label block 14 of the special paper 10 by near-field communication according to a specific standard or based on a specific standard, writes information to a specific address in the semiconductor memory of the RFID tag 11, and reads information stored in the semiconductor memory of the RFID tag 11. Writing information to a specific address in the semiconductor memory of the RFID tag 11 is referred to below as simply "writing information to the RFID tag 11," and reading information stored in the semiconductor memory of the RFID tag 11 is referred to as simply "reading information from the RFID tag 11." The reader/writer 15 works with other parts and devices in this embodiment to function as a data writing unit that writes information by wireless communication to the RFID tag 11 (contactless tag) embedded in the media.

The recording mechanism 24 is a mechanism that records an image on the recording surface 14a of a label block 14 of the special paper 10, and includes a recording head 25. The recording head 25 is a line thermal head having heat elements arrayed in a direction crossing the conveyance direction of the special paper 10, and records images using the combination of dots formed by applying heat to the recording surface 14a of the label block 14 of the special paper 10. In this embodiment the recording mechanism 24 works with other parts and devices to function as a recording unit that records on the recording surface of media.

The conveyance mechanism 26 includes a conveyance motor 27 and a platen roller 28 connected to the conveyance motor 27, turns the platen roller 28 in a specific direction by driving the conveyance motor 27, and conveys the special paper 10 in the conveyance direction by rotation of the platen roller 28.

The memory unit 40 is nonvolatile flash ROM, for example, that receives and stores specific information such as report information from the host computer 3. When an error occurs, for example, this information is read by the control unit 20 and recorded on the special paper 10 by the recording mechanism 24.

The RTC 29 (real-time clock) keeps the current date and time (date and time) using power supplied from a battery not shown, and outputs time information indicating the current date and time ("time data" below) to the control unit 20. In addition to a control circuit, the RTC 29 includes volatile RTC memory 29a and non-volatile RTC memory 29b.

Time data indicating the current time and date is stored in the volatile RTC memory 29a. In addition to data and a control program for controlling the RTC 29, reset data (reset history) indicating that the RTC 29 was reset in the past is stored in the non-volatile RTC memory 29b.

A RTC 29 reset means that the RTC 29 stopped operating and then resumed operation. Operation will stop, for example, if the power supply to the RTC 29 is interrupted because of a poor battery terminal connection or because the battery ran out of power. When the normal power supply to the RTC 29 resumes, the data stored in the volatile RTC memory 29a is cleared and the RTC 29 then resumes operating. This is called a reset. The RTC 29 also resets after operation is interrupted by a reset signal from the host computer 3 or noise, for example. Because the time data stored in the volatile RTC memory 29a is initialized and the RTC 29 then starts operating and resumes keeping time when the RTC 29 is reset, the date and time indicated by the time data stored in the volatile RTC memory 29a will differ from the actual date and time. When the RTC 29 is thus reset, the RTC 29 control circuit stores reset data in the non-volatile RTC memory 29b indicating the RTC 29 was reset. In practice, this reset data could be a flag stored at a specific address in the non-volatile RTC memory 29b.

The host computer 3 is a terminal that controls the media processing device 2, has a device driver for controlling the media processing device 2 installed, sends control commands and information for recording on the special paper 10, and information to be written to the RFID tag 11, to the media processing device 2, and causes the media processing device 2 to execute specific processes using functions of the device driver.

Figure 3:
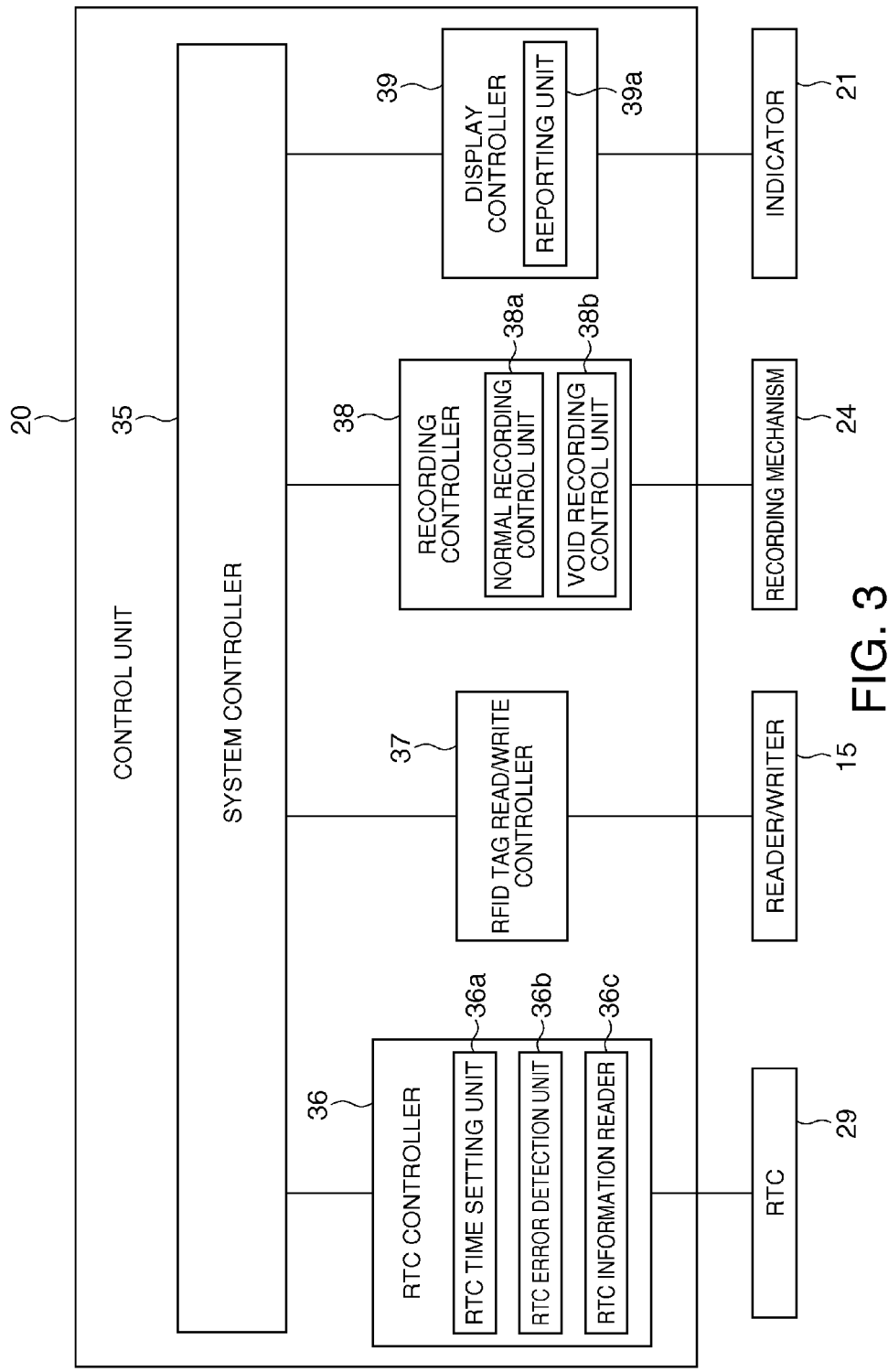
FIG. 3 is a block diagram showing a functional configuration of a media processing device.

FIG. 3 shows the function blocks of the main functions of the control unit 20. The functions of the function blocks shown in FIG. 3 are achieved by the cooperation of hardware and software, such as the CPU of the control unit 20 reading and executing a basic control program stored in ROM.

A system controller 35 centrally controls an RTC controller 36, an RFID tag read/write controller 37, a recording controller 38, and a display controller 39.

The RTC controller 36 is a function block that controls the RTC 29, and includes a RTC time setting unit 36a, RTC error detection unit 36b (error detection unit), and RTC information reader 36c. Note that the function of the RTC error detection unit 36b (error detection unit) can be performed by the CPU of the control unit 20.

The RTC time setting unit 36a is a function block that sets the date and time kept by the RTC 29 by overwriting the time data stored in the volatile RTC memory 29a. The device driver installed in the host computer 3 also functions to provide a user interface for the user to input the date and time to be kept by the RTC 29. To set the current date and time when the RTC 29 is reset, the user inputs the current date and time through the user interface. Another function of the device driver generates a control command for writing time data indicating the date and time input by the user to the volatile RTC memory 29a of the RTC 29, and sends the command to the media processing device 2. When this control command is received, the RTC time setting unit 36a accesses the volatile RTC memory 29a of the RTC 29, and overwrites the time data stored in memory with time data indicating the date and time input by the user based on the control command.

The RTC error detection unit 36b is a function block that detects RTC 29 errors. The RTC error detection unit 36b detects RTC 29 errors using the two methods described below.

In the first method, the RTC error detection unit 36b accesses the volatile RTC memory 29a of the RTC 29. If data cannot be normally written to or read from the volatile RTC memory 29a, the RTC 29 is not operating normally due to insufficient battery power, poor contact, or other reason, and the RTC error detection unit 36b detects a RTC 29 error.

In the second method, the RTC error detection unit 36b accesses the non-volatile RTC memory 29b of the RTC 29. If the reset data is stored at the specific address in memory, the RTC error detection unit 36b detects a RTC 29 error. This is because if the RTC 29 was reset, the date and time indicated by the time data stored in the volatile RTC memory 29a may differ from the actual date and time as described above. If the RTC 29 was reset, there may also be a problem with some other part of the media processing device 2.

The RTC information reader 36c accesses the volatile RTC memory 29a of the RTC 29, acquires the time data stored in the memory (data indicating the current date and time kept by the RTC 29), and outputs the time information to the system controller 35.

The RFID tag read/write controller 37 controls the reader/writer 15 as controlled by the system controller 35, and writes information to the RFID tag 11 embedded in the label block 14 of the special paper 10, or reads information from the RFID tag 11.

The recording controller 38 controls the recording mechanism 24, and records an image on the recording surface 14a of a label block 14 of the special paper 10. The recording controller 38 includes a normal recording control unit 38a and a VOID recording control unit 38b.

The display controller 39 outputs drive signals through the signal processor to the LEDs of the indicator 21, and causes the LEDs to turn on or off in specific ways. The display controller 39 includes a reporting unit 39a.

The basic operation of the media processing device 2 according to this embodiment of the invention when producing a baggage tag is described next.

Figure 4:
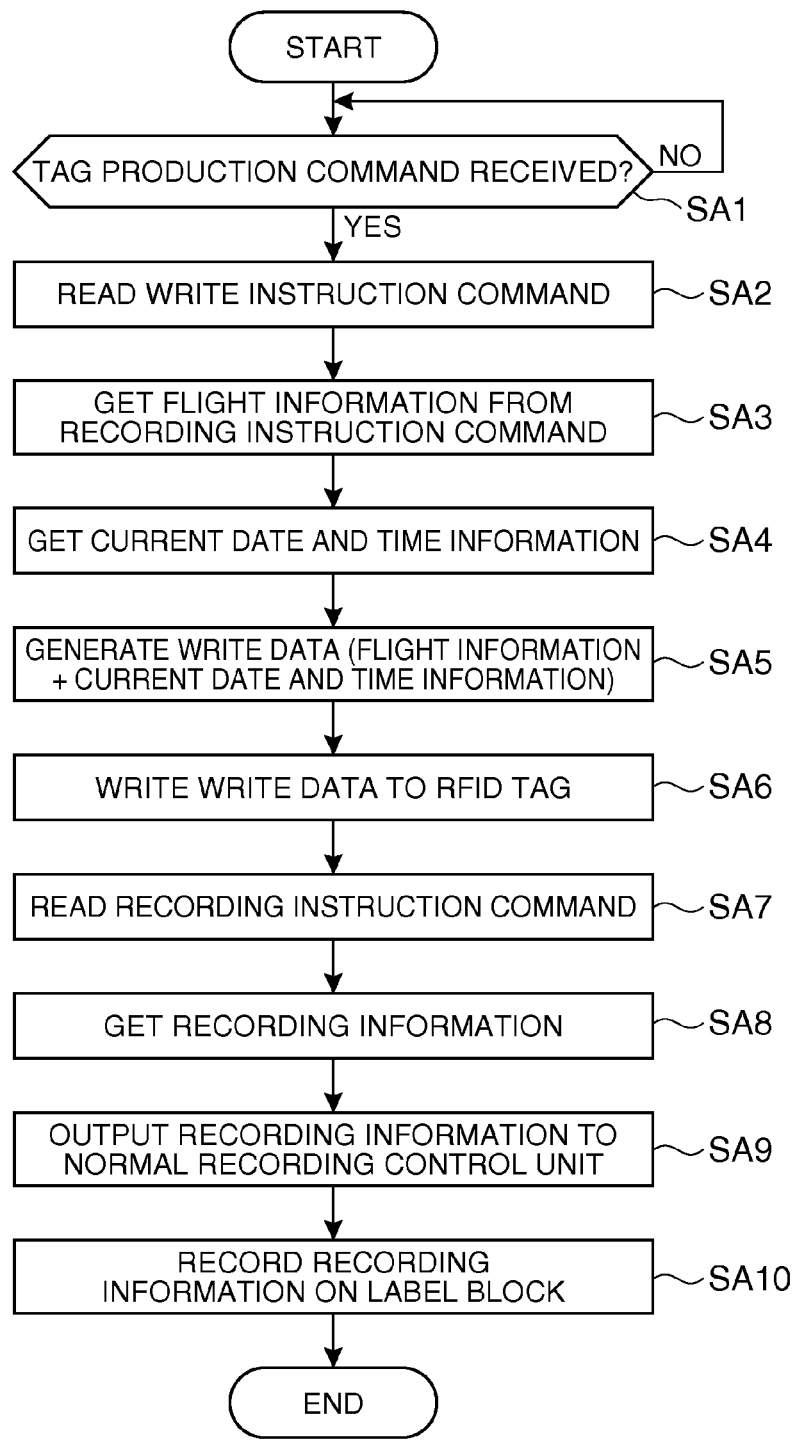
FIG. 4 is a flow chart of media processing device operation.

FIG. 4 is a flow chart of operation of media processing device 2 when producing a baggage tag. Note that the special paper 10 is suitably conveyed below, and further description of the conveyance method is omitted.

The system controller 35 of the control unit 20 of the media processing device 2 first checks if a control command (tag production command) for producing a baggage tag was received from the host computer 3 (step SA1).

This tag production command is described in detail below.

As described above, when a bag is checked by a customer, a tag is produced with identification information identifying the flight on which the bag should be loaded recorded on the recording surface of the baggage tag and written to the RFID tag 11. To produce a baggage tag, the host computer 3 generates and sends a tag production command including a recording instruction command C1 and a writing instruction command C2 to the media processing device 2.

The recording instruction command C1 is a control command that contains recording information D1 (identification information) and instructs recording the recording information D1 on the recording surface 14a of the label block 14 to be issued as a baggage tag. In this embodiment the recording information D1 contains identification information including at least one of (1) information about the customer, such as the customer name (customer information); (2) information identifying the flight on which the bag should be loaded (flight information); and (3) a barcode identifying the flight on which the bag should be loaded (barcode information). By recording recording information D1 containing at least one of the customer information, flight information, and barcode information on the recording surface of the baggage tag, the flight on which the bag to which the baggage tag is attached should be loaded can be identified by reading the recording information D1 or scanning the barcode information with a barcode reader. The information contained in the recording information D1 is not limited to the foregoing, and information other than the three types described above can be included in the identification information.

The media processing device 2 could receive only the recording information D1 instead of the recording instruction command C1 from the host computer 3. In this implementation, the recording information D1 is identification information identifying the tag to be produced, and the media processing device 2 proceeds from step SA2 described below after receiving recording information D1 as the identification information.

The writing instruction command C2 is a control command that instructs writing write data D2 to the RFID tag 11. This write data D2 includes the flight information contained in the foregoing recording information D1, and current date and time information (time-related information, referred to below as "current date and time information"). The particular flight on which the bag should be loaded can be identified more accurately by using this combination of flight information and current date and time information. When baggage is sorted according to the actual flights on which bags should be loaded, the write data D2 is read from the RFID tag 11 by an RFID tag 11 reader not shown, and the flight on which a bag should be loaded can be identified based on the write data D2 that was read. The write data D2 is thus used to identify the flight on which a bag should be loaded. Even if this flight information is wrong, the correct flight can be determined from the information stored at check-in by comparing the current date and time information written to the RFID tag 11 and the time of check-in stored in the check-in system. If the current date and time information written to the RFID tag 11 is incorrect (does not indicate the current time and date), the wrong flight may be identified by the write data D2, or identifying the flight may not be possible. As a result, writing write data D2 containing inaccurate current date and time information to the RFID tag 11 must be reliably prevented.

In this embodiment the current date and time information includes both the date (year, month, day) and time (hour and minute), but other information, such as the month and day, could be used instead if the information in combination with the flight information can uniquely identify a particular flight.

When a tag production command is received (step SA1 returns YES), the system controller 35 reads the writing instruction command C2 contained in the tag production command (step SA2). The next steps SA3 to SA6 are executed by the system controller 35 reading and executing the writing instruction command C2.

The system controller 35 acquires the flight information from the recording information D1 contained in the recording instruction command C1 of the tag production command (step SA3).

Next, the system controller 35 gets the time data stored in the volatile RTC memory 29a of the RTC 29 from the RTC information reader 36c, and gets the current date and time information (step SA4).

Next, the system controller 35 generates write data D2 combining the flight information acquired in step SA3 and the current date and time information acquired in step SA4 (step SA5), and controls the RFID tag read/write controller 37 to write the write data D2 to the RFID tag 11 through the reader/writer 15 (step SA6).

Next, the system controller 35 reads the recording instruction command C1 contained in the tag production command (step SA7). The following steps SA8 to SA10 are performed by the system controller 35 reading and executing the recording instruction command C1.

Next, the system controller 35 gets the recording information D1 contained in the recording instruction command C1 (step SA8), and outputs to the normal recording control unit 38a of the recording controller 38 (step SA9). Based on the input recording information D1, the normal recording control unit 38a executes required processes such as writing the image data of the recording information D1 to an image buffer, and controls the recording mechanism 24 to record the recording information D1 on the recording surface 14a of the label block 14 (step SA10).

A baggage tag is thus produced with the write data D2 (flight information and current date and time information) written to the RFID tag 11, and the recording information D1 (customer information, flight information, barcode information) recorded on the recording surface.

Even if the media processing device 2 receives only the recording information D1 from the host computer 3, the system controller 35 could control the recording mechanism 24 to record the recording information D1 on the recording surface 14a of the label block 14, automatically generate write data D2 combining at least some of the information contained in the recording information D1 and the current date and time information, and control the RFID tag read/write controller 37 to write the write data D2 to the RFID tag 11 through the reader/writer 15.

As described above, the write data D2 written to the RFID tag 11 is used to identify the flight on which the bag should be loaded, but if the current date and time information is not accurate (does not indicate the current date and time), the wrong flight could be identified based on the write data D2, and writing write data D2 containing inaccurate current date and time information to the RFID tag 11 must be reliably prevented. Furthermore, if there is a problem with the RTC 29 such as the RTC 29 having been reset, there could be a problem with part of the media processing device 2 due to noise, for example, and correctly writing the write data D2 to the RFID tag 11 may not be possible.

The media processing device 2 according to this embodiment of the invention performs the following operation to address this issue.

Figure 5:
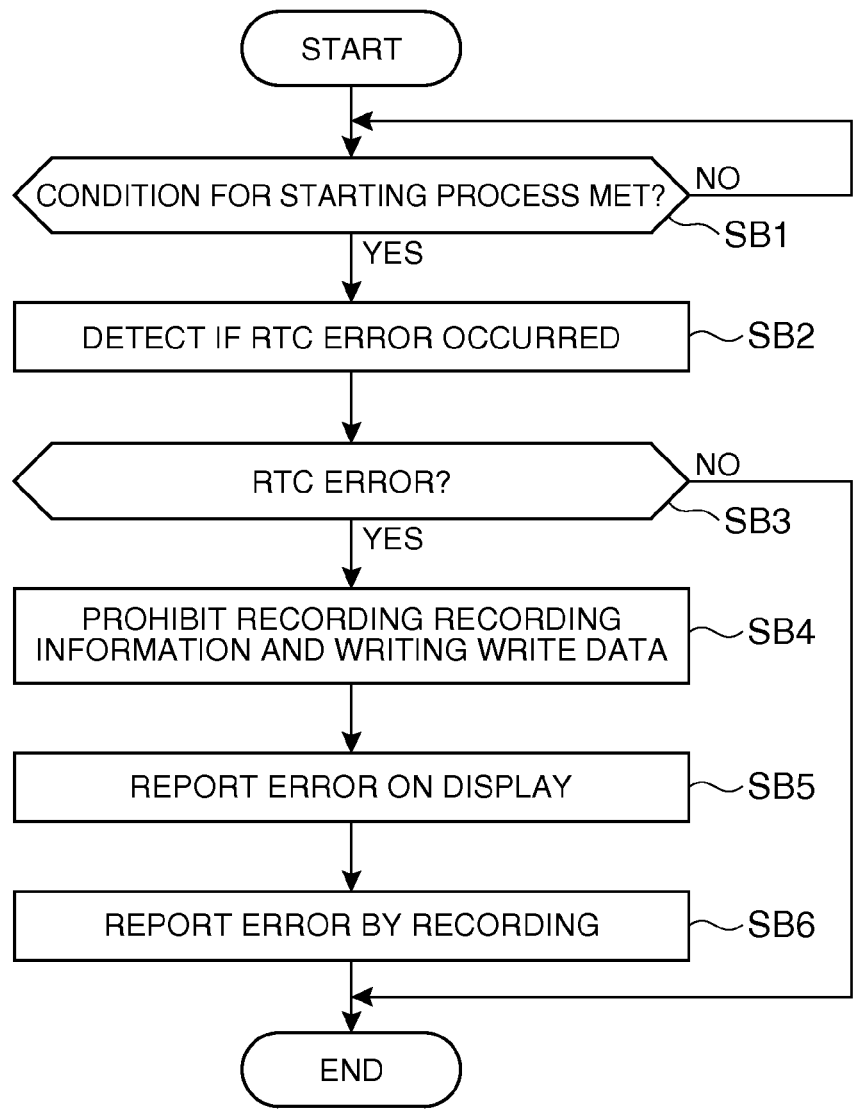
FIG. 5 is a flow chart of media processing device operation.

FIG. 5 is another flow chart of operation of media processing device 2.

First, the system controller 35 of the control unit 20 of the media processing device 2 checks if the specific condition for starting the process from step SA2 was met (step SB1).

The specific condition could be that the media processing device 2 power is on, a tag production command was received, and a specific time has past since the last baggage tag was produced, for example, and can be desirably set by the user.

If the condition is met (step SB1 returns YES), the system controller 35 uses the RTC error detection unit 36b to detect if a RTC 29 error occurred (step SB2).

Next, the system controller 35 determines if a RTC 29 error occurred (step SB3), and ends the process if an error did not occur (step SB3 returns NO).

If a RTC 29 error occurred (step SB3 returns YES) and a tag production command is then received from the host computer 3, the system controller 35 prohibits or blocks recording the recording information D1 and writing the write data D2 to the RFID tag 11 based on the received command (step SB4). The system controller 35 could also discard the received recording instruction command C1 and recording information D1.

As a result, when a RTC 29 error has occurred and the current date and time information based on the time kept by the RTC 29 may be wrong (does not indicate the current date and time), writing the write data D2 containing incorrect current date and time information is reliably prevented. Because a RTC 29 error occurred, the system controller 35 could also decide there is a possible problem with part of the media processing device 2. Writing the wrong information can be prevented in this situation because the write data D2 is not written to the RFID tag 11.

Next, the reporting unit 39a of the display controller 39 drives the LEDs of the indicator 21 in a specific way as controlled by the system controller 35 to report that baggage tag production is prohibited because of a RTC 29 error (step SB5). As a result, the user can read the indicator 21 and quickly know that baggage tag production is prohibited because of a RTC 29 error.

Next, the VOID recording control unit 38b of the recording controller 38 controls the recording mechanism 24 and prints a VOID as controlled by the system controller 35 (step SB6). Printing a VOID refers to recording a predetermined image indicating that a problem, including a RTC 29 error, has occurred in the media processing device 2, and records the image on the recording surface 14a of the label block 14. By reading the image recorded on the recording surface 14a of the label block 14, the user can quickly know that producing baggage tags is prohibited due to a RTC 29 error.

Alternatively, the VOID recording control unit 38b could read and record report data indicating an error or VOID from the memory unit 40 on the recording surface 14a of the label block 14. Settings including the position, direction, size, font, and color, for example, for recording the report information on the special paper 10 are also stored in the memory unit 40, and at least one of these settings is used to record on the special paper 10.

A configuration that clears a flag prohibiting recording the recording information D1 and writing the write data D2 to the RFID tag 11 that was enabled in step SB4 when the RTC 29 error is resolved is also conceivable. After resolving the connection problem or battery problem, the user can use a function of the RTC time setting unit 36a to clear the RTC 29 error.

As described above, the media processing device 2 according to this embodiment of the invention has a real-time clock 29; a RTC error detection unit 36b that detects RTC 29 errors; a data writing unit (reader/writer 15 and related parts and devices) that writes data to the RFID tag 11 of a label block 14 of special paper 10 by wireless communication; a recording unit (recording mechanism 24 and related parts and devices) that records on the recording surface 14a of a label block 14 of the special paper 10; and a system controller 35 (control unit) that records recording information D1 and writes write data D2 using the time kept by the RTC 29 based on a tag production command received from the host computer 3.

When a RTC 29 error is detected, the system controller 35 prohibits recording the recording information D1 and writing the write data D2 based on a tag production command received from the host computer 3.

As a result, because the system controller 35 prohibits writing the write data D2 when a RTC 29 error occurs, knowing that the current date and time information contained in the write data D2 is based on the time kept by the RTC 29 can be used to reliably prevent writing incorrect information to the RFID tag 11. Furthermore, because the system controller 35 prohibits recording the recording information D1 on the label block 14 when writing the write data D2 is prohibited, mistakenly thinking that write data D2 was correctly written to the RFID tag 11 because the label block 14 was printed normally can be prevented, and the user can be made aware that a RTC 29 error occurred by making the user aware that recording on the label block 14 is prohibited.

The media processing device 2 according to this embodiment of the invention also has a reporting unit 39a that reports detection of a RTC 29 error by the RTC error detection unit 36b.

This configuration enables the user to quickly know that a RTC 29 error occurred based on the report by the reporting unit 39a, and can take corrective action.

When a RTC 29 error is detected by the RTC error detection unit 36b, the reporting unit 39a in this embodiment controls the recording mechanism 24 to record an error report on the recording surface 14a of the label block 14. The user can thus know that data was not written to the RFID tag 11 embedded in the label block 14 on which this error report is printed and the RFID tag 11 cannot be used.

This configuration enables using a feature of the device configuration, that is, the recording mechanism 24, to reliably inform the user that a RTC 29 error occurred.

The RTC error detection unit 36b in this embodiment detects a RTC 29 error when the RTC error detection unit 36b detects that the RTC 29 is not operating, or detects that the time of the RTC 29 was reset.

This embodiment of the invention can thus use a characteristic of the RTC 29 to appropriately detect RTC 29 errors. That there may be a problem with part of the media processing device 2 can also be determined.

The above-described embodiment of the invention is simply one possible embodiment. Variations and alternatives with the scope of the invention are possible, as one skilled in the art will recognize from the disclosure. For example, the recording head 25 of the media processing device 2 in this embodiment is a thermal head, but the recording method is not so limited; instead, an inkjet head, dot impact head, or other recording method could be used. The communication protocol of the IC tag of the medium is not limited to that of the above embodiment; any suitable communication standard can be used. More specifically, the invention has wide application in devices that write information based on a RTC 29 to an IC tag.

Moreover, the function blocks shown in FIG. 1 and FIG. 3 can be achieved in many ways through the cooperation of software and hardware. Such block diagrams do not suggest a specific hardware configuration. The functions of individual function blocks of the media processing device 2 can also be offloaded to a separate device externally connected to, or in communication with, the media processing device 2. The media processing device 2 can also execute the operations described above by the system controller 35 reading and running a program stored on an external storage medium.

Also, the special paper 10 is also not limited to label paper. More broadly, special paper 10 could be any continuous recording medium having RFID tags affixed at a specific interval thereto.

Each of these and other variations and modifications are intended to be part of the invention to the extent that it falls within the scope of the following claims.

What is claimed is:

1. A label printer configured to connect to a control device, the label printer comprising:
   a real-time clock configured to keep time;
   an error detector configured to detect a real-time clock error;
   a data writer configured to write predetermined information by wireless communication to an IC tag embedded in a label on continuous paper; and
   a printing mechanism configured to print on the label; and
   a controller configured to
      control the data writer,
      control the printing mechanism,
      check the error detector when identification information is received from the control device,
      acquire time information from the real-time clock,
      cause the data writer to write the time information and identification information to the IC tag and the printing mechanism to print a symbol code on the label if the error detector did not detect a real-time clock error, and
      cause the data writer to prohibit the writing of the time information and identification information to the IC tag if the error detector detected a real-time clock error.

2. The label printer described in claim 1, further comprising:
   a reporter;
   wherein the controller controls the reporter to report if a real-time clock error was detected by the error detector.

3. The label printer described in claim 1, wherein:
   the controller controls the printing mechanism to print report information on the label if a real-time clock error was detected by the error detector.

4. The label printer described in claim 1, further comprising:
   a memory configured to store report information;
   wherein the controller controls the printing mechanism to print the identification information on the label if a real-time clock error was not detected by the error detector, and controls the printing mechanism to print the report information stored in the memory on the label if a real-time clock error was detected by the error detector.

5. The label printer described in claim 1, wherein:
   the error detector detects a real-time clock error if the real-time clock is not operating or if the time kept by the real-time clock is reset.

6. A control method for a label printer configured to connect to a control device and including a real-time clock configured to keep time, an error detector configured to detect a real-time clock error, a data writer configured to write predetermined information by wireless communication to an IC tag embedded in a label on continuous paper, and a printing mechanism configured to print on the label, the control method comprising:
   checking the error detector when identification information is received from the control device;
   acquiring time information from the real-time clock,
   writing the time information and identification information to the IC tag using the data writer and printing a symbol code on the label using the printing mechanism if the error detector did not detect a real-time clock error; and prohibiting the writing of the time information and identification information to the IC tag if the error detector detected a real-time clock error.

7. The control method for a label printer described in claim 6, wherein:

the label printer has a reporter;

the control method further comprising reporting by the reporter if a real-time clock error was detected by the error detector.

8. The control method for a label printer described in claim 6, the control method further comprising:

printing report information on the label by the printing mechanism if a real-time clock error was detected by the error detector.

9. The control method for a label printer described in claim 6, wherein:

the label printer a memory configured to store report information;

the control method further comprising:

printing the identification information on the label by the printing mechanism if a real-time clock error was not detected by the error detector; and printing the report information stored in the memory on the label by the printing mechanism if a real-time clock error was detected by the error detector.

10. The control method for a label printer described in claim 6, wherein:

the error detector detects a real-time clock error if the real-time clock is not operating or if the time kept by the real-time clock is reset.

11. A non-transitory storage medium configured to store a program for execution by a controller configured to control parts of a label printer configured to connect to a control device and that includes a real-time clock configured to keep time, an error detector configured to detect a real-time clock error, a data writer configured to write predetermined information by wireless communication to an IC tag embedded in a label on continuous paper, and a printing mechanism configured to print on the label, the program causing the controller to:

check the error detector when identification information is received from the control device;

acquire time information from the real-time clock;

cause the data writer to write the time information and identification information to the IC tag and the printing mechanism to print a symbol code on the label if the error detector did not detect a real-time clock error; and cause the data writer to prohibit the writing of the time information and identification information to the IC tag if the error detector detected a real-time clock error.

12. The non-transitory storage medium storing the program described in claim 11, wherein:

the label printer has a reporter; and the program causes the controller to report by the reporter if a real-time clock error was detected by the error detector.

13. The non-transitory storage medium storing the program described in claim 11, the program causing the controller to:

print report information on the on the label by the printing mechanism if a real-time clock error was detected by the error detector.

14. The non-transitory storage medium storing the program described in claim 11, wherein:

the label printer has a memory configured to store report information; and the program causes the controller to:

print the identification information on the label by the printing mechanism if a real-time clock error was not detected by the error detector, and print the report information stored in the memory on the label by the printing mechanism if a real-time clock error was detected by the error detector.

15. The non-transitory storage medium storing the program described in claim 11, wherein:

the error detector detects a real-time clock error if the real-time clock is not operating or if the time kept by the real-time clock is reset.

* * * * *